United States Patent [19]

Herzfeld

[11] 3,942,423
[45] Mar. 9, 1976

[54] DEVICE FOR AGING WINE OR THE LIKE
[75] Inventor: Fred Herzfeld, Cleveland Heights, Ohio
[73] Assignee: Lisa Rosenblatt, Cleveland Heights, Ohio
[22] Filed: Aug. 2, 1974
[21] Appl. No.: 494,193

Related U.S. Application Data
[63] Continuation-in-part of Ser. No. 368,252, June 8, 1973, abandoned.

[52] U.S. Cl. .............................................. 99/277.1
[51] Int. Cl.² ............................................ C12H 1/22
[58] Field of Search ....... 99/277, 277.1, 277.2, 275, 99/276, 278; 426/7, 8

[56] References Cited
UNITED STATES PATENTS
2,086,073  7/1937  Francescon ....................... 99/277.1
2,108,661  2/1938  Farrier ............................... 99/277.1
2,114,009  4/1938  Ramsay ............................. 99/277.1
2,203,229  6/1940  Nilsson ............................. 99/277.1

Primary Examiner—Robert W. Jenkins
Attorney, Agent, or Firm—Donnelly, Maky, Renner & Otto

[57] ABSTRACT

A device for aging wine or the like comprises an elongated wooden rod having opposite ends and at least one longitudinal bore extending from one end toward the other. Sealant means is provided for sealing the exterior surface of the rod adjacent the one end. The rod is made from heartwood of white oak of a type which produces tyloses in the heartwood. Examples of suitable white oak are quercus alba and quercus bicolor.

12 Claims, 1 Drawing Figure

U.S. Patent   March 9, 1976   3,942,423
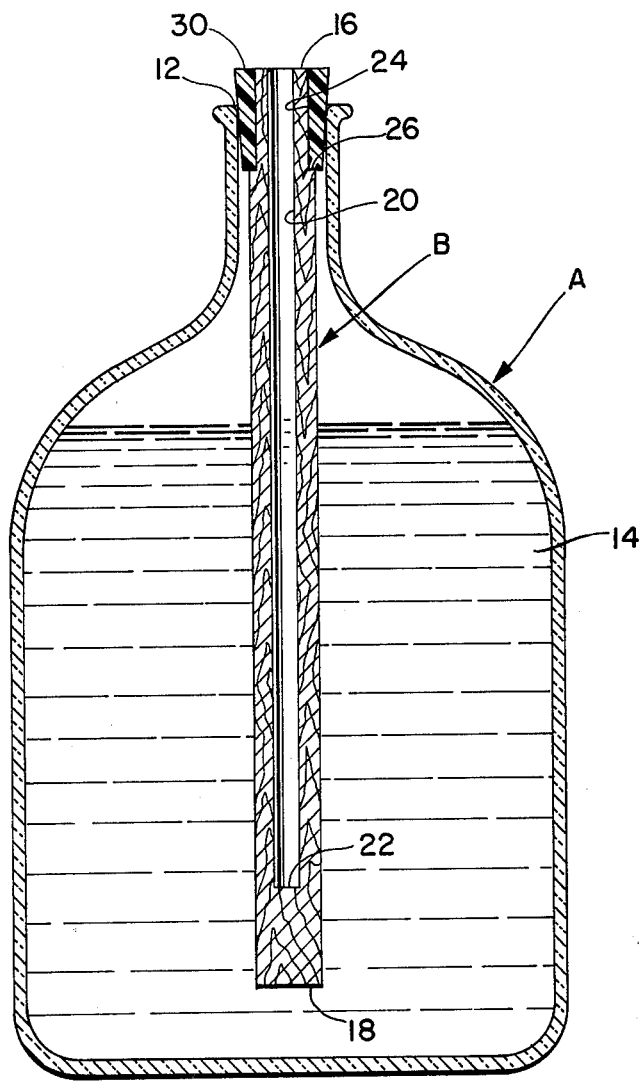

DEVICE FOR AGING WINE OR THE LIKE

CROSS-REFERENCE TO RELATED APPLICATION

This application is a continuation-in-part of copending U.S. patent application Ser. No. 368,252, filed June 8, 1973, now abandoned.

BACKGROUND OF THE INVENTION

This application pertains to the art of aging wine or the like, and more particularly to a device for aging wine in non-wooden impervious containers in order to obtain substantially the same aging qualities as are obtained in a wooden cask.

Many arrangements and devices have been proposed for aging wine or the like in impervious non-wooden containers in an attempt to obtain aging qualities similar to those obtained in a wooden cask. U.S. Pat. No. 429,826, issued June 10, 1890, to Wagoner discloses an arrangement wherein high pressure air is forced through a porous plug positioned in a wine container. The porous plug of Wagoner is disclosed as being made of California redwood and its walls are very thin. The Wagoner device requires high pressure in order to keep the wine from entering the hollow porous plug. Forcing air under high pressure into wine or the like provides oxygen diffusion at too rapid a rate and undesirable qualities are imparted to the wine. Diffusion of oxygen into wine, and diffusion of carbon dioxide out of the wine, must be carried on at a very slow rate in order to prevent formation of undesirable compounds in the wine.

U.S. Pat. No. 2,108,661, issued Feb. 15, 1938, to Farrier discloses an arrangement wherein a wooden plug member is sufficiently porous so that liquid in the container may seep therethrough into an internal bore. Such an arrangement is undesirable because a large surface area must be provided in order to obtain desirable diffusion and evaporation rates. In addition, Farrier has a lateral hole through his dowel near the neck of the bottle. Such a hole prevents diffusion through the wood itself and will not provide properr aging.

U.S. Pat. No. 2,114,009, issued Apr. 12, 1938, to Ramsay discloses an arrangement wherein a wooden dowel has a bore which is completely open at the bottom end of the dowel and a plurality of longitudinally-spaced lateral bores are formed through the dowel intersecting the longitudinal bore. Such an arrangement does not allow diffusion and evaporation through the wood itself and desirable aging properties cannot be obtained.

U.S. Pat. No. 2,203,229, issued June 4, 1940, to Nilsson discloses a plurality of different embodiments, and in FIG. 5 discloses an arrangement wherein a wooden dowel has a blind longitudinal bore therein for obtaining diffusion and evaporation through the dowel itself.

SUMMARY OF THE INVENTION

A device for aging wine or the like comprises an elongated wooden rod having opposite ends and a longitudinal bore extending from one of the ends toward the other. Sealant means is provided for sealing the exterior surface of the rod adjacent the one end. Applicant has found that undesirable capillary action will take place around the stopper on the rod unless the exterior surface of the wood is thoroughly sealed. Any suitable sealant may be used provided it is approved for use in devices which are used for processing food or liquid for human consumption. In one arrangement, the sealant may comprise a silicone rubber adhesive applied to the exterior surface of the rod adjacent the one end thereof. Natural or neoprene rubber adhesives may also be used. It is also possible to mold an elastomeric stopper onto one end portion of the rod so that it will inherently bond to the rod and seal the exterior surface of same. In a preferred arrangement, a stopper is applied to the one end portion of the rod before the sealant means is cured so that the stopper will be securely bonded to the one end portion of the rod and the stopper will be sealed against the rod for preventing liquid from flowing upwardly between the rod and stopper by capillary action.

Applicant has found that it is necessary to form the rod from heartwood of white oak of a type which produces tyloses in the heartwood when the sapwood is converted to heartwood. Any other type of wood is too porous and a proper evaporation or diffusion rate cannot be obtained.

This invention relates to methods for the aging and maturing of alcoholic liquids as in fermenting and fermented wines and wine-like beverages.

A main object is to furnish a means which may be used with non-porous and non-gas-diffusing containers such as for example glass carboys, to convert them to the "equivalent" (to be defined) of normally used wooden aging and maturing casks.

Another object is to furnish a means which together with a non-porous and non-gas-diffusing container of a specified size forms an aging and maturing unit "equivalent" in maturing properties to a wooden aging and maturing cask of any other specified size.

A further object is to furnish a means whereby the amount and rate on a per gallon basis of oxygen diffusing into and the amount and rate on a per gallon basis of carbon dioxide diffusing out of the liquid contained in a non-porous and non-gas-diffusing container may be adjusted to the same amount and rate on a per gallon basis as normally occurs in any type or size wooden cask as may be specified.

Another object is to furnish a means whereby the amount of water and alcohol on a per gallon basis evaporating from non-porous and non-gas-diffusing containers may be adjusted to approximate the evaporation of said water and alcohol on a per gallon basis from any type and size wooden cask as may be specified.

Another object is to furnish a means which together with a non-porous and non-gas-diffusing container allows the same surface contact area on a per gallon basis between wood and liquid in said container as said liquid might have on a per gallon basis in any specified size aging and maturing cask.

With these objects in view, the invention consists of a certain novel apparatus by which the said objects and certain other objects which will hereinafter appear are attained, the invention being more particularly pointed out in the claims.

BRIEF DESCRIPTION OF THE DRAWING

The drawing shows an impervious non-wooden container having the wine aging device of the present invention positioned therein.

DESCRIPTION OF A PREFERRED EMBODIMENT

Referring now to the drawing, wherein the showing is for the purpose of illustrating the preferred embodiment of the invention only and not for purposes of limiting same, an impervious non-wooden container A of glass or other suitable materials has a generally cylindrical neck opening 12. Container A is adapted to hold a predetermined volume of wine or the like shown generally at 14.

An elongated cylindrical rod B made from heartwood of white oak of a type which produces tyloses in the heartwood is suspended in container A through inlet neck 12. Rod B has upper and lower ends 16 and 18, and a centrally located cylindrical bore 20 extends through rod B from end 16 toward end 18 and terminates in a bore bottom 22 short of rod end 18.

Rod B is provided with a small diameter portion 24 adjacent end 16 and this provides a circumferential shoulder 26 on rod B. An elastomeric stopper 30 is positioned around small diameter end portion 24 for cooperation with the surface of neck inlet opening 12 to seal between such inlet neck and stopper 30 for preventing escape or ingress of gases to container A. Stopper 30 may be made of any suitable materials including silicone rubber, or natural or neoprene rubber.

In accordance with an important aspect of the invention, the exterior surface of rod B around small diameter portion 24, shoulder 26 and a small portion adjacent the shoulder 26 are sealed with sealant means. When a stopper is simply positioned around rod B, it has been found that capillary action takes place drawing liquid up between the inner surface of stopper 30 and the exterior surface of rod B around small diameter portion 24. Such capillary action also takes place across shoulder 26. This saturates the outer surface of rod B along with end 16 and produces unequal swelling of the wood so that cracking occurs. In addition, such capillary action draws liquid from the container where it evaporates at end 16. In order to prevent this undesirable capillary action, sealant means is provided to completely seal the pores in the outer surface of rod B adjacent end 16. In one arrangement, it is possible to provide any suitable adhesive, such as a silicone rubber adhesive, or a natural or neoprene rubber adhesive to the exterior surface of rod B around small diameter portion 24, shoulder 26 and a small portion of rod B adjacent shoulder 26. Obviously, other sealants can also be used. In a preferred arrangement, stopper 30 is positioned on small diameter portion 24 before the sealant has cured so that stopper 30 will be securely bonded to rod B in sealing relationship thereto. In another arrangement, it is possible to mold stopper 30 directly on small diameter end portion 24 of rod B so that it will inherently bond and seal to the exterior surface of rod B. It is important that the sealant not be applied to the exterior surface of rod B except in the general area of stopper 30. Otherwise, such sealant would prevent diffusion and evaporation through rod B in the desired manner.

Rod B and bore 20 are desirably dimensioned in order to obtain substantially the same aging properties as are obtained on a per gallon basis in a wooden cask or the like. One example will be described with respect to a 5 gallon container. Where container A is a standard 5 gallon glass jug, rod B has a length of approximately 17 inches so that end 18 will be spaced approximately 1½ inches from the bottom of container A. End 18 of rod B is preferably spaced between one and two inches from the bottom of container A in order to prevent diisturbing of sediment in the bottom of container A when rod B is removed. Bore end 22 is spaced between one and two inches from rod end 18, and preferably is spaced approximately 1½ inches from end 18. A relatively large spacing is necessary because the grain of the wood runs parallel to the longitudinal axis of rod B and bore 20, and a relatively thick lower end is necessary to prevent bleeding of the liquid into bore 20 through end 18. Rod B has a diameter of approximately 1 inch, and bore 20 has a diameter of approximately 7/16 inch. With such dimensions for use in a 5 gallon jar, it has been found that diffusion and evaporation rates are substantially the same on a per gallon basis as those obtained in a wooden cask of approximately 50 gallons capacity. With such a rod, the seal is applied to the exterior surface thereof over a length of approximately ½ inch from shoulder 26 in addition to being applied to such shoulder and the exterior surface of small diameter portion 24.

In the process of the production of wine or wine-like beverages it is common practice to store freshly produced wine or wine-like beverages in wooden casks for an extended period of time to allow said wine or wine-like beverage within said cask to age and mature prior to bottling or consumption. During the time the wine or wine-like beverage is stored in a wooden cask changes occur in the chemical composition of the wine or wine-like beverage due to (a) very slow diffusion of oxygen through the wooden surface of the cask into the interior of said cask where said oxygen is absorbed and dissolved into the said wine or wine-like beverage causing said chemical changes and reactions, a too rapid diffusion of oxygen into the wine or wine-like beverage resulting in a final product which does not have the best sensory qualities and is inferior to wine or wine-like beverages aged and matured in casks having proper rate and amount of oxygen diffusion; (b) the slow removal of carbon dioxide from the wine or wine-like beverage through the wooden surface of the cask to the exterior of said cask where said carbon dioxide is dispersed; (c) an exchange of chemicals between the interior wooden surface of the cask and the wine or wine-like beverage in contact with said wooden interior surface of said cask.

The rate at which changes occur is important in producing high quality wine or wine-like beverages. The rate is generally controlled by use of an appropriate size wooden cask, said appropriate size being determined by required surface to volume ratio of said wooden cask. It is well known that casks of small volume have a surface to volume ratio which is too large for the production of high quality wine or wine-like beverages, said large surface to volume ratio producing an oxygen diffusion rate at which chemical reactions occur which do not produce high quality product.

The apparatus for converting a glass or other nonporous, non-gas-diffusing container to the "equivalent" of a wooden cask is as follows. A round wooden rod is made of such a diameter that it will pass into and through the neck of the glass or other container and of such length as to reach from approximately 1 inch above the lip of said container to approximately the bottom of said container. The wood of which said rod is made is the same wood as would normally be used for wooden casks. A circular hole is drilled through the length of the wood rod starting at the top of said rod and ending approximately ½ inch short of the bottom of said rod. The diameter of said drilled hole controls the wall thickness of the now constructed closed bottom wood tube, said tube wall thickness in turn regulating rate of diffusion of oxygen into and carbon dioxide out of wine or wine-like beverage within said container and external to said wooden tube. As an example the wall thickness of a wood tube in a container holding 5 gallons of wine or wine-like beverage may be adjusted to allow the same amount of oxygen per gallon to diffuse into and the same amount of carbon dioxide per gallon to pass out of the contained liquid as would occur in a 50 gallon wood cask, said tube would then be labeled a "5 gallon to 50 gallon equivalent" tube. Similarly with thicker walls or a shorter tube one can construct a "1 gallon to 50 gallon equivalent " tube. A tube as above constructed may be made more fully equivalent to any size wooden cask for any size glass container as follows. The difference in surface area per gallon between the surface area of any normally used wooden cask and the surface area per gallon of the "equivalent" tube is made up by carving into the exterior surface of the tube grooves, either circular or similar to threads on machine screws, or grooves running the length of the tube. The purpose of said grooves is to increase the surface area of wood tube such that it becomes approximately equal on a per gallon basis to inside wood surface exposed to liquid of normally used wooden cask again on a per gallon basis. The depth and number of grooves and spacing is determined so that the above-mentioned equality of surface area on a per gallon basis will be achieved. Optionally, the use of all or a part of the grooves may be avoided at a slight cost in the quality of the wine or wine-like beverage produced.

In practice air must be passed down to the bottom of the drilled hole through a piece of rubber tubing (or tubing of any material) of smaller diameter than said drilled hole to expel carbon dioxide, water vapor and alcohol vapor which would otherwise collect inside drilled hole of wooden tube. The top of the tube is sealed to the container with airtight gasket, or rubber stopper having a hole to accept tube and making airtight joint to said tube, said stopper having outside diameter making airtight connection to inside diameter of neck and container.

I have made such a tube and used it in the production of wine and the aging and maturing of wine and have found that it works well and gives a resulting wine which is superior to the same wine made without the special aging and maturing tube described herein.

The embodiments of the invention in which an exclusive property of privilege is claimed are defined as follows:

1. A device for aging wine or the like comprising; an elongated wooden rod made from heartwood of white oak of a type which produces tyloses in the heartwood and with the grain running parallel to the longitudinal axis of said rod, said rod having opposite ends, at least one longitudinally extending bore in said rod extending from one of said ends toward the other of said ends to leave a thickened end which prevents bleeding of the wine into said bore, and sealant means for sealing the exterior surface of said rod adjacent said one end, the wall of said bore between said opposite ends of said rod allowing slow penetration of gases only and preventing seeping of wine into said bore.

2. The device of claim 1 wherein said sealant means includes an elastomeric stopper sealingly bonded to the exterior surface of said rod adjacent said one end.

3. The device of claim 2 wherein said rod has a small diameter portion adjacent said one end which provides a circumferential shoulder axially spaced from said one end, said stopper being sealingly bonded to the exterior surface of said small diameter portion and to the surface of said circumferential shoulder.

4. The device of claim 1 wherein said rod has a small diameter portion adjacent said one end which provides a circumferential shoulder axially spaced from said one end, said sealant means being applied to said rod for sealing the exterior surface of said small diameter portion and the surface of said circumferential shoulder.

5. The device of claim 1 wherein said bore has a bore bottom spaced at least one inch from said other end.

6. The device of claim 1 wherein said rod is for use with a non-wooden container having a predetermined volume, said rod having an outer surface area and said bore having a predetermined diameter and length so that the amount of oxygen and carbon dioxide respectively diffusing in and out of liquid in said container through said rod is substantially the same on a per gallon basis as it would be in a wooden cask of predetermined size.

7. The device in claim 1 wherein said rod extends through a neck opening in an impervious non-wooden container, and stopper means sealed around said rod adjacent said one end and sealingly engaging said neck opening.

8. The device of claim 7 wherein said other end of said rod is positioned between one and two inches above the bottom of said container and said bore terminates between one and two inches short of said other end of said rod.

9. The device of claim 8 wherein said container has a liquid capacity of approximately 5 gallons, said rod having a length of approximately 17 inches and a diameter of approximately 1 inch, and said bore having a diameter of approximately 7/16 inch.

10. The device of claim 7 wherein said rod is dimensioned to obtain substantially the same aging qualities on a per gallon basis for wine in said container as is obtained in a wooden cask of predetermined size.

11. The device of claim 1 and including a stopper sealingly bonded to said rod adjacent said one end.

12. A device for aging wine or the like comprising; an elongated wooden rod made from heartwood or white oak of a type which produces tyloses in the heartwood and with the grain running parallel to the longitudinal axis of said rod and having opposite rod ends, a bore in said rod extending from one of said ends thereof toward the other of said ends and terminating short of said other end to leave a thickened end which prevents bleeding of the wine into said bore, said rod and bore being dimensioned for obtaining substantially the same aging action on a per gallon basis as is obtained in a wooden cask of predetermined size, the wall of said bore allowing slow penetration of gases only and preventing seeping of wine into said bore.

* * * * *